(12) United States Patent
Chen

(10) Patent No.: US 6,969,080 B2
(45) Date of Patent: Nov. 29, 2005

(54) DAMPER FOR FRONT FORK OF VEHICLE

(75) Inventor: Hui-Hsiung Chen, Taichung (TW)

(73) Assignee: Spinner Industry Co., Ltd., Taichung (TW)

( * ) Notice: Subject to any disclaimer, the term of this patent is extended or adjusted under 35 U.S.C. 154(b) by 48 days.

(21) Appl. No.: 10/793,922

(22) Filed: Mar. 8, 2004

(65) Prior Publication Data

US 2005/0133323 A1  Jun. 23, 2005

(30) Foreign Application Priority Data

Dec. 18, 2003  (TW) .............................. 92222194 U

(51) Int. Cl.[7] .................................................. F16F 9/34

(52) U.S. Cl. ...................... 280/276; 280/279; 280/283; 188/322.15

(58) Field of Search ................................ 280/274–277, 280/279, 283; 188/282.1, 282.7, 282.8, 284–286, 188/297, 322.13, 322.15

(56) References Cited

U.S. PATENT DOCUMENTS

| | | | | | |
|---|---|---|---|---|---|
| 2,570,362 | A | * | 10/1951 | Mercier | .................... 188/282.7 |
| 4,807,860 | A | * | 2/1989 | Simons | ................. 188/322.13 |
| 4,971,344 | A | * | 11/1990 | Turner | ........................ 280/276 |
| 5,094,324 | A | * | 3/1992 | Tsai | ...................... 188/322.15 |
| 6,120,049 | A | * | 9/2000 | Gonzalez et al. | ...... 188/322.15 |
| 6,767,024 | B1 | * | 7/2004 | Kuo | ........................... 280/276 |
| 6,802,407 | B1 | * | 10/2004 | Chen | ..................... 188/322.13 |
| 2005/0104320 | A1 | * | 5/2005 | Wesling et al. | ............. 280/276 |
| 2005/0121271 | A1 | * | 6/2005 | Chen | .......................... 280/276 |

* cited by examiner

*Primary Examiner*—Matthew Luby
(74) *Attorney, Agent, or Firm*—Bacon & Thomas PLLC

(57) ABSTRACT

A front fork shock-absorbing damper for use in between an upper front fork tube and a lower front fork tube of a vehicle's front fork for producing a damping effect upon movement of the upper front fork tube relative to the lower front fork tube includes a control rod movable by an external force between a top locking position where the front fork shock-absorbing damper does no work, and a bottom unlocking position where the front fork shock-absorbing damper is functioning.

6 Claims, 7 Drawing Sheets

DAMPER FOR FRONT FORK OF VEHICLE

BACKGROUND OF THE INVENTION

1. Field of the Invention

The present invention relates generally to a vehicle, such as a bicycle, motorcycle, etc., and, more specifically, to a damper for use in a front fork of the vehicle.

2. Description of the Related Art

A hydraulic shock-absorbing damper of bicycle front fork forces the internal fluid to change the flowing path upon relative movement between the upper front fork tube and the lower front fork tube, thereby absorbing shocks. However, this shock-absorbing damper absorbs active force from the pedals when the rider riding the bicycle upwards on a slope, giving a burden to the rider.

Therefore, an improved design of front fork shock-absorbing structure is developed to eliminate the aforesaid problem. This improved design of front fork shock-absorbing structure allows the bicycle rider to control the structure to work or not to work subject to different road conditions. According to this design, a control rod is provided and movable between a first position where the bottom end of the control rod blocks the fluid passage to prohibit flowing of the fluid between the upper front fork tube and the lower front fork tube, and a second position where the fluid passage is fully opened for enabling the fluid to circulate between the upper front fork tube and the lower front fork tube. This design of front fork shock-absorbing structure is still not satisfactory in function. Because the control rod is adapted to block the fluid passage directly, it directly receives upward impact pressure from the fluid during relative emotion between the upper front fork tube and the lower front fork tube when the rider riding the bicycle over an uneven road surface. Frequently receiving upward impact pressure from the fluid may cause the parts of the control rod to loose. Further, because the device for controlling the position of the control rod is usually provided at the bottom side of the front fork, it is inconvenient to adjust the position of the control rod.

SUMMARY OF THE INVENTION

It is the primary objective of the present invention to provide a front fork having a shock-absorbing damper for a vehicle, which allows the user to control the front fork shock-absorbing damper to work or not to work accurately.

It is another objective of the present invention to provide a front fork having a shock-absorbing damper for a vehicle, which has a relief loop design for absorbing sudden impact pressure as the bicycle running over an uneven road surface after the user controlled the front fork shock-absorbing damper not to work.

To achieve these objectives of the present invention, the front fork comprises an upper front fork tube, a lower front fork tube axially movably coupled to the upper front fork tube, a fluid contained in the upper and lower front fork tubes, and a damper immersed in the fluid and sealedly mounted inside the upper front fork tube. The damper comprises a cylindrical main body, a first blocking member, a first spring member, a second blocking member, a second spring member, a control rod, a third blocking member and a third spring member. The main body has a fluid inlet and a fluid outlet axially extended therethrough, and at least one through hole in communication between the fluid inlet and an outside of the main body. The first blocking member is mounted in the fluid inlet of the main body and movable between a first blocking position where the first blocking member blocks the through hole to prohibit flowing of the fluid from the lower front fork tube upwards to the upper front fork tube, and a first opening position where the first blocking member is moved away from the through hole for enabling the fluid to pass upwards from the lower front fork tube through the fluid inlet and the through hole to the upper front fork tube. The first spring member is mounted in the fluid inlet for holding the first blocking member in the first blocking position. The second blocking member is mounted in the fluid inlet above the first blocking member and movable between a second blocking position where the second blocking member blocks the fluid inlet, and a second opening position where the second blocking member opens the fluid inlet. The second spring member is mounted in the fluid inlet for pushing the second blocking member to the second blocking position. The control rod is inserted into the upper front fork tube and movable by an external force between a locking position where the second blocking member is positioned in the second blocking position, and an unlocking position wherein the control rod pushes the second blocking member to the second opening position and holds the second blocking member in the second opening position. The third blocking member is mounted in the fluid outlet of the main body and movable between a third blocking position where the third blocking member prohibits the fluid from passing upwards from said lower front fork tube through the fluid outlet of the main body to the upper front fork tube, and a third opening position where the fluid is allowed to flow downwards from the upper front fork tube through the fluid outlet to the lower front fork tube. The third spring member is mounted in the fluid outlet for holding the third blocking member in the third blocking position.

DETAILED DESCRIPTION OF THE INVENTION

Figure 1:
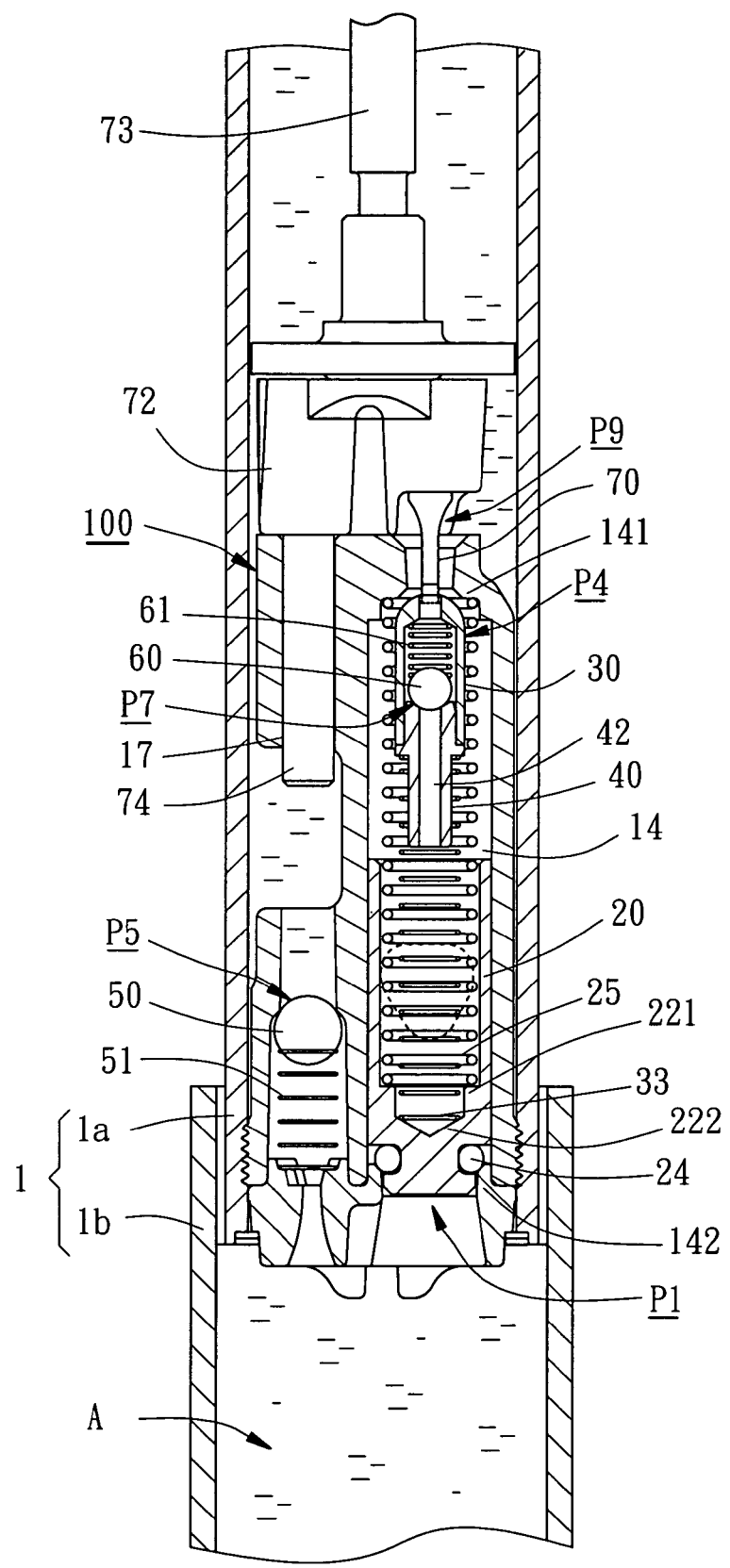
FIG. 1 is a sectional view of the present invention where the upper and lower front fork tubes are maintained immovable relative to each other.
Figure 2:
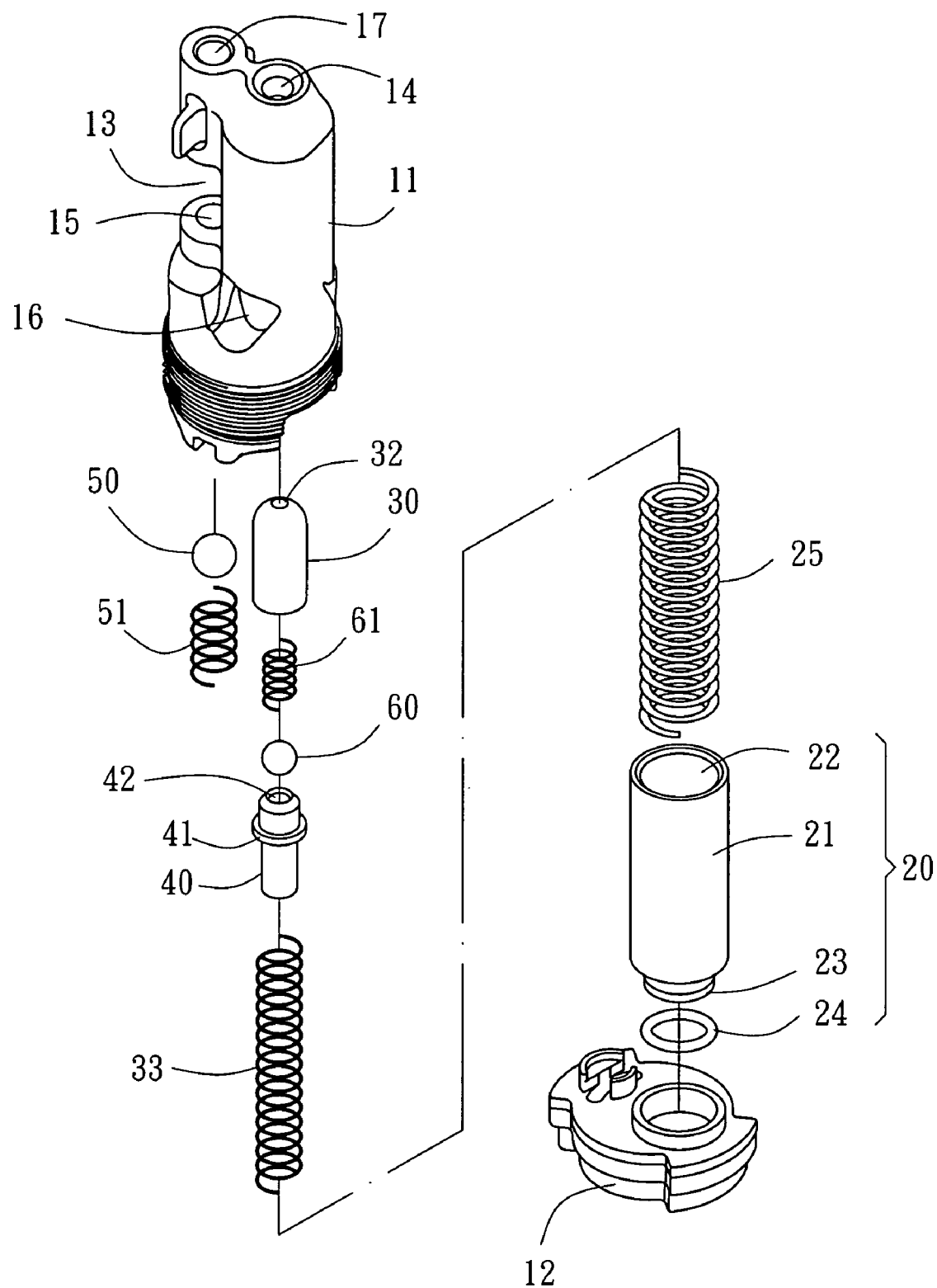
FIG. 2 is an exploded view of the front fork shock-absorbing damper according to the present invention.
Figure 3:
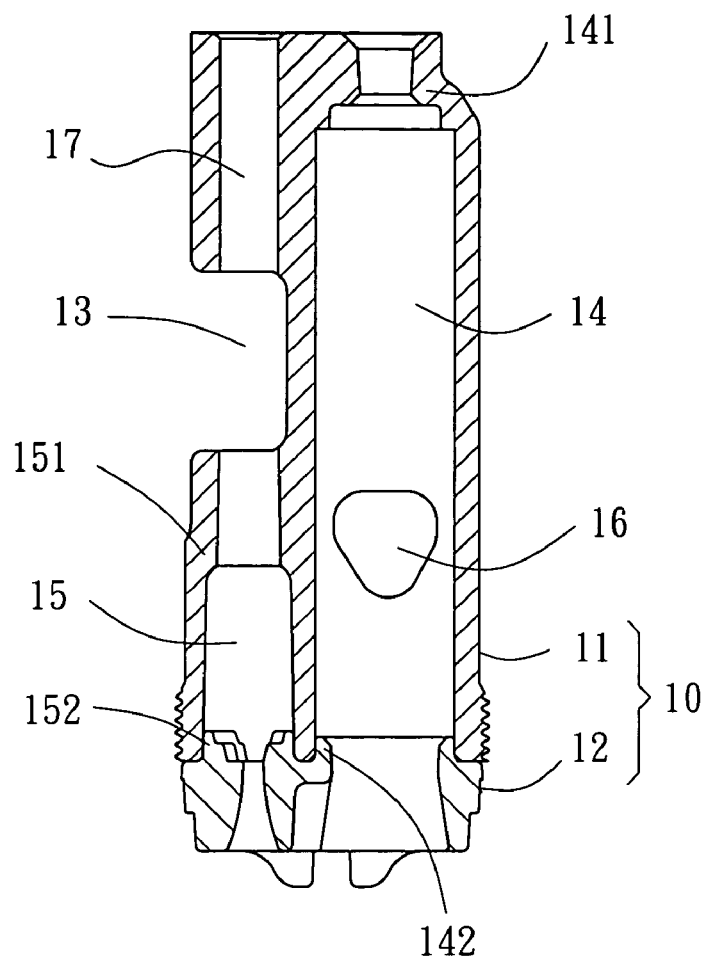
FIG. 3 is a sectional view of the main body of the front fork shock-absorbing damper according to the present invention.

As shown in FIGS. 1–4, a front fork 1 is shown comprising an upper front fork tube 1a, a lower front fork tube 1b axially movably coupled to the upper front fork tube 1a, a fluid A is contained in the upper and lower front fork tubes 1a and 1b, and a front fork shock-absorbing damper 100 sealedly fastened to the inside of the upper front fork tube 1a and immersed in the fluid A.

The damper 100 comprises a main body 10, a first blocking member 20, a first spring member 25, a second blocking member 30, a second spring member 33, a spacer member 40, a first ball 50, a first ball spring 51, a second ball 60, a second ball 25 spring 61, a control rod 70, a coupling block 72, a link 73, and a guide rod 74.

The main body 10 is comprised of a cylindrical casing 11 and a bottom block 12 fastened to the bottom side of the cylindrical casing 11. The cylindrical casing 11 has a neck 13 on the middle. The main body 10 has a fluid inlet 14 axially extended through the casing 11 and the bottom block 12, a fluid outlet 15 axially extended through the bottom block 12 and the casing 11 below the neck 13, two upper shoulders 141 and 151 respectively disposed around the top ends of the fluid inlet 14 and the fluid outlet 15, two bottom shoulders 142 and 152 respectively disposed around the bottom ends of the fluid inlet 14 and the fluid outlet 15, two transverse through holes 16 extended across the periphery of the casing 11 below the neck 13 in communication between the fluid inlet 14 and the outside of the main body 10, and a longitudinal through hole 17 disposed above the neck 13 in axial alignment with the fluid outlet 15. It is to be noted that only one transverse through hole 16 is shown in the drawings.

Figure 5:
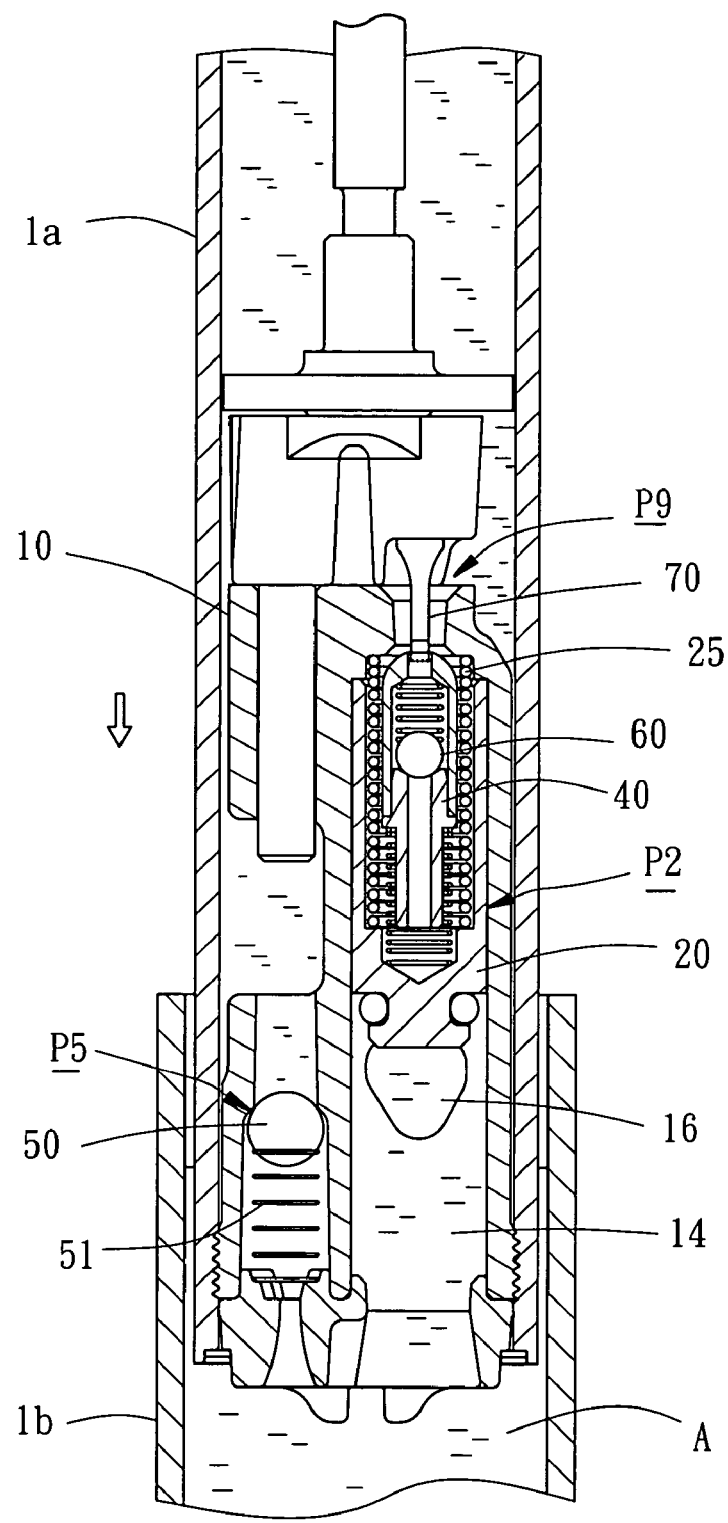
FIG. 5 is similar to FIG. 1 but showing the unlocking status of the front fork shock-absorbing damper and downward movement of the upper front fork tube relative to the lower front fork tube.

The first blocking member 20 is a hollow cylindrical member mounted in the fluid inlet 14 and vertically (axially) movable between a first blocking position P1 as shown in FIG. 1 and a first opening position P2 as shown in FIG. 5, having a block body 21, an enclosed head 23 axially extended from the bottom side of the block body 21, and a seal ring 24 fastened to the periphery of the enclosed head 23. The block body fits the inner diameter of the fluid inlet 14, having an axial hole 22 axially upwardly extended from the enclosed head 23 to the top side, a first step 221 and a second step 222 formed in the axial hole 22 inside the enclosed head 23 at different elevations.

The first spring member 25 is mounted in the fluid inlet 14, having one end stopped at the upper shoulder 141 and the other end inserted into the axial hole 22 and stopped against the first step 221. The first spring member 25 imparts a downward pressure to the first blocking member 20 to force the enclosed head 23 and the seal ring 24 against the bottom shoulder 142, thereby holding the first blocking member 20 in the first blocking position P1 as shown in FIG. 1.

Figure 7:
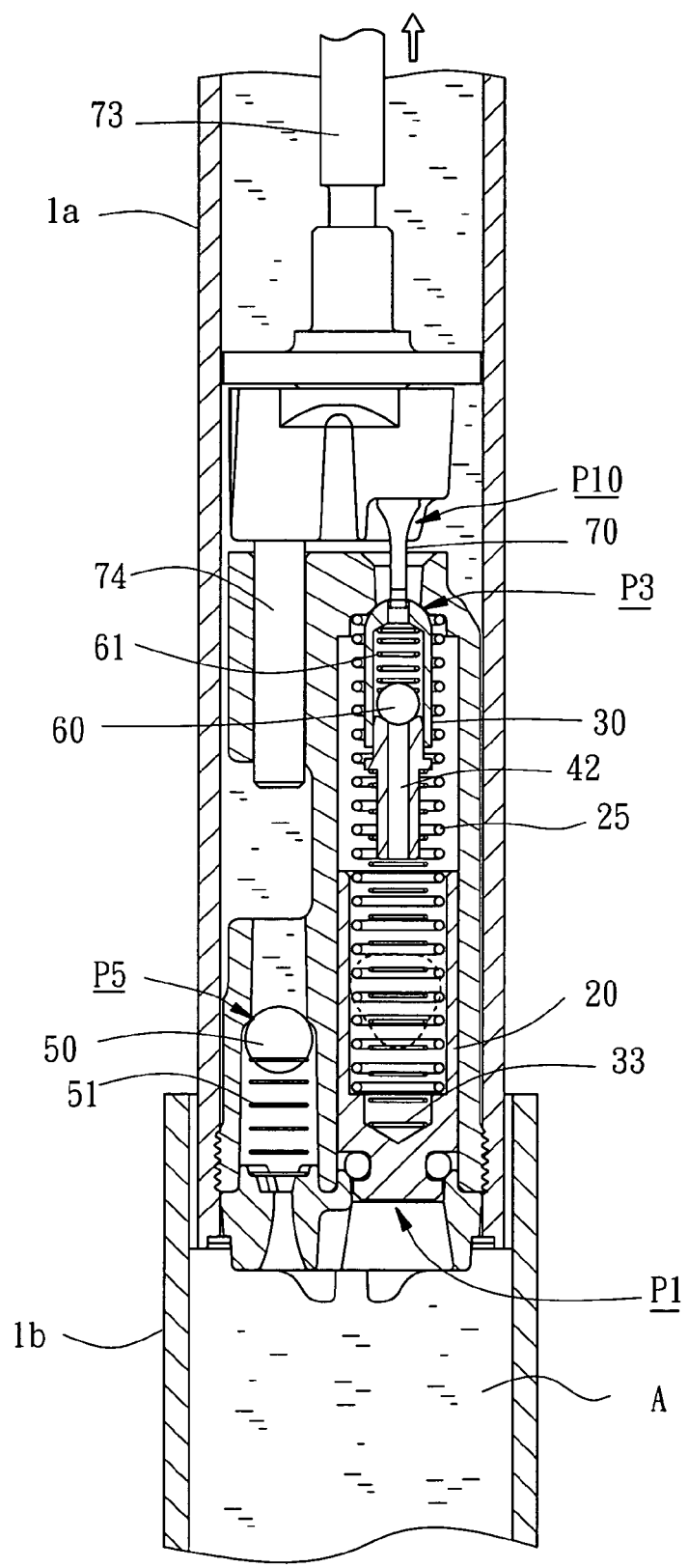
FIG. 7 is similar to FIG. 1 but showing the front fork shock-absorbing damper set in the locking position and the second blocking member blocked the fluid inlet.

The second blocking member 30 is a hollow cylindrical member mounted in the fluid inlet 14 above the first blocking member 20 and vertically (axially) movable between a second blocking position P3 as shown in FIG. 7 and a second opening position P4 as shown in FIG. 1. The outer diameter of the second blocking member 30 is smaller than the inner diameter of the block body 21 of the first blocking member 20, having an inside hole 31 and a top through hole 32 in communication with the inside hole 31.

The second spring member 33 has a relatively smaller diameter than the aforesaid first spring member 25, and is axially inserted inside the first spring member 25, having one end, namely, the bottom end stopped at the second step 222 and the other end, namely, the top end extending toward the second blocking member 30 and stopped at the spacer member 40.

The spacer member 40 is a rod member press-fitted with the upper part thereof into the inside hole 31 of the second blocking member 30, having a stop flange 41 extended around the periphery and an axial through hole 42 axially extended through the top and bottom ends thereof in communication between the inside hole 31 of the second blocking member 30 and the fluid inlet 14. The top side of the stop flange 41 is closely attached to the bottom side of the second blocking member 30. The bottom side of the stop flange 41 is stopped against the top end of the second spring member 33.

Figure 6:
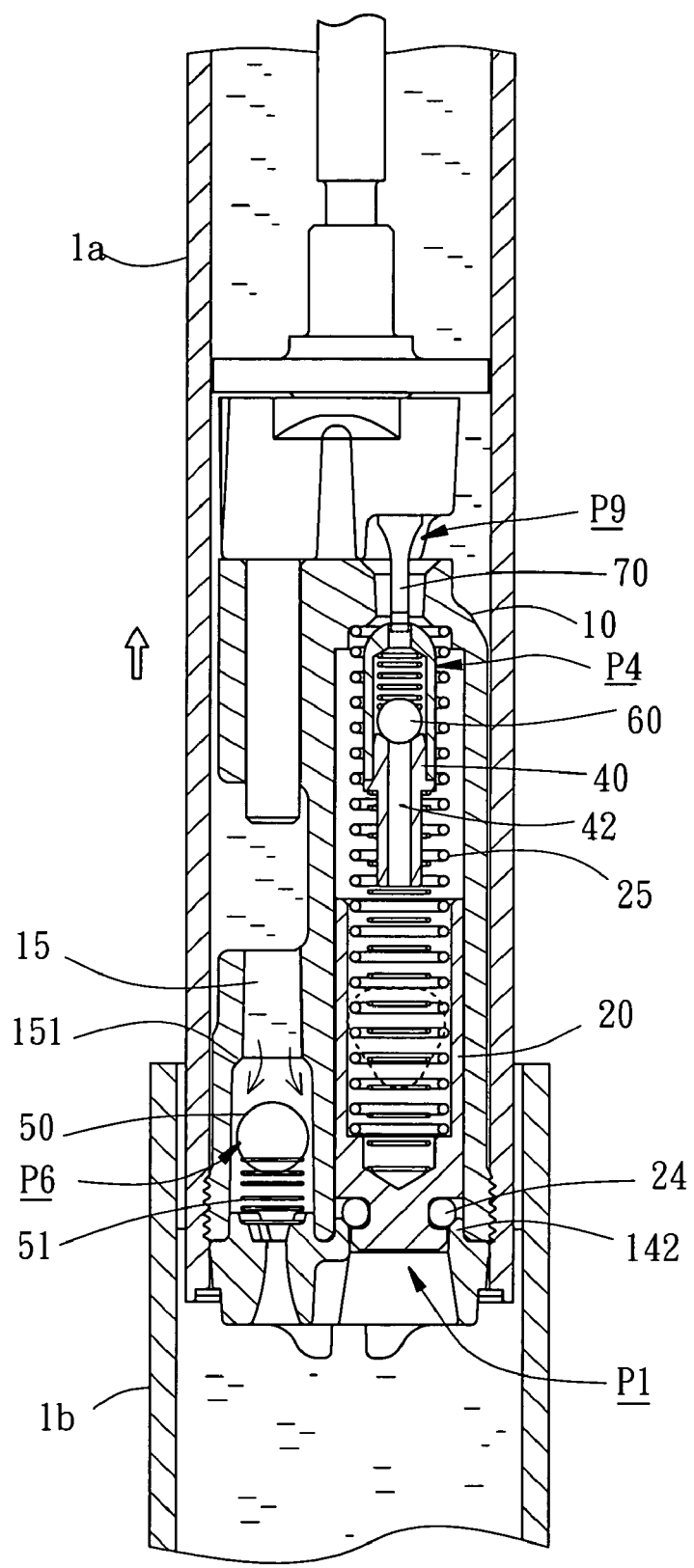
FIG. 6 is similar to FIG. 5 but showing upward movement of the upper front fork tube relative to the lower front fork tube.

The first ball 50, i.e. the third blocking member, and the first ball spring 51 are mounted in the fluid outlet 15 of the main body 10. The first ball spring 51 has one end stopped at the bottom shoulder 152 and the other end stopped at the bottom side of the first ball 50. The first ball spring 51 imparts an upward pressure to the first ball 50 against the upper shoulder 151, holding the first ball 50 in a third blocking position P5 as shown in FIG. 1. The first ball 50 can be forced away from the upper shoulder 151 by downward flowing force of the fluid A to a third opening position P6 as shown in FIG. 6.

Figure 8:
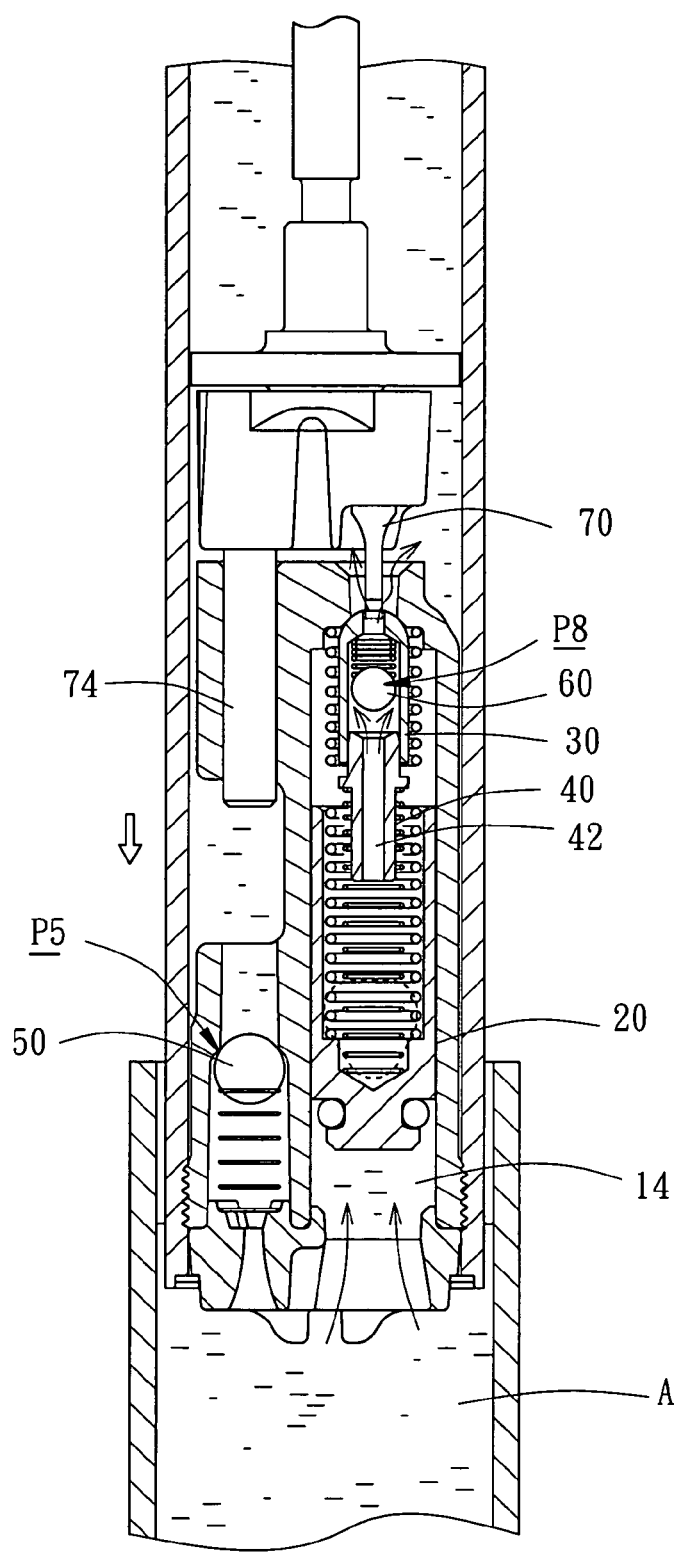
FIG. 8 is similar to FIG. 7 but showing the front fork shock-absorbing damper set in the locking status and the fourth blocking member moved to the fourth opening position.

The second ball 60, i.e. the fourth blocking member, and the second ball spring 61 are put in the inside hole 31 of the second blocking member 30 before connection of the spacer member 40 to the second blocking member 30. The second ball spring 61 imparts a downward pressure to the second ball 60 against the spacer member 40, thereby causing the second ball 60 to block the axial through hole 42 of the spacer member 40, i.e., the second ball spring 61 holds the second ball 60 in a fourth blocking position P7 as shown in FIG. 1 to block the passage between the inside hole 31 and the fluid inlet 14. Further, the second ball 60 can be moved away from the fourth blocking position P7 to a fourth opening position P8 by upward flowing force of the fluid A as shown in FIG. 8.

Figure 4:
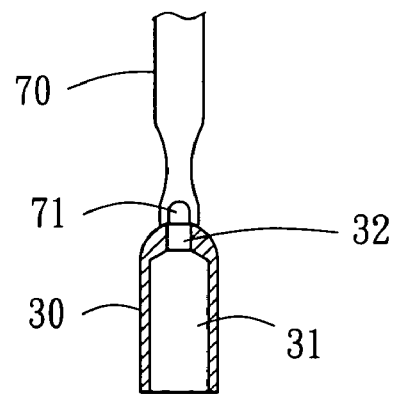
FIG. 4 is a schematic drawing showing the relationship between the control rod and the second blocking member according to the present invention.

The control rod 70 is coupled to the link 73 by the coupling block 72, and mounted with the coupling block 72 and the link 73 in the upper front fork tube 1a. The link 73 extends upwardly to the outside of the upper front fork tube 1a, and can be moved vertically up and down with the control rod 70 and the coupling block 71 by an external force. Because the driving method of the link 73 is not within the scope of the present invention, no further detailed description in this regard is necessary. As shown in FIG. 1, the guide rod 74 is provided at the bottom side of the coupling block 72 in parallel to the control rod 70. When the bottom end of the control rod 70 entered the fluid inlet 14 and touched the second blocking member 30, the guide rod 74 is inserted into the longitudinal through hole 17 of the casing 11 to guide axial movement of the control rod 70. As shown in FIG. 4, the control rod 70 has a bottom notch 71 in the bottom side of the flat lower part thereof corresponding to the top through hole 32 of the second blocking member 30. The control rod 70 can be alternatively set between an unlocking position P9 as shown in FIG. 1 and a locking position P10 as shown in FIG. 7.

The operation of the front fork shock-absorbing damper 100 is outlined hereinafter.

FIG. 1 shows the standing status of the bicycle where the upper front fork tube 1a and the lower front fork tube 1b are not moved relative to each other. At this time, the first blocking member 20 is in the first blocking position P1, the second blocking member 30 is in the second opening position P4, the first ball 50 is in the third blocking position P5, and the fluid A is prohibited from passing through the main body 10.

When the upper front fork tube 1a is moving downwards relative to the lower front fork tube 1b during running of the bicycle as shown in FIG. 5, the fluid A below the main body 10 is forced to move the first blocking member 20 upwards to the first opening position P2. At this time, the first block member 20 does not block the transverse through holes 16, and the fluid A is circulating through the fluid inlet 14 into the transverse through holes 16 toward the top side of the main body 10. When the upper front fork tube 1a is moving upwards relative to the lower front fork tube 1b as shown in FIG. 6, a part of the fluid A above the main body 10 flows into the fluid inlet 14, and the first spring member 25 is released, thereby causing the first blocking member 20 to be returned to the first blocking position P1. At the same time, a part of the fluid A flows through the neck 13 into the fluid outlet 15 to move the first ball 50 to the third opening position P6, and therefore the fluid A is allowed to pas to the bottom side of the main body 10. By means of the aforesaid action, the fluid A is moving upwards and downwards through the main body 10 to absorb shocks during relative motion between the upper front fork tube 1a and the lower front fork tube 1b.

Further, the rider may control the front fork 1 not to provide a shock absorbing effect subject to the condition of the road. At this time, the rider can drives the link 73 to move the control rod 70 upwards to a locking position P10 when the first blocking member 20 is in the first blocking position P1 and the first ball 50 is in the third blocking position P5 as shown in FIG. 7. At this time, the second spring member 33 pushes the second blocking member 30 upwards to the second blocking position P3 to block the fluid inlet 14 of the main body 10, and the second ball 60 is held by the second ball spring 61 to block the top through hole 42, stopping the fluid A from passing through the main body 10, and therefore the front fork shock-absorbing damper 100 does no work.

If the bicycle unexpectedly moves over an uneven road surface (or a hole on the road) when the front fork shock-absorbing damper 100 set in the locking status, the first blocking member 20 will receive a sudden impact pressure from the fluid A. This sudden impact pressure is greater than the reactive force from the road surface against the bicycle, thereby causing the first blocking member 20 to be moved upwards to squeeze the fluid A as shown in FIG. 8. However, because the second blocking member 30 blocks the fluid inlet 14 at this time, the squeezed fluid A will move upwards through the top through hole 42 to push the second ball 60 to the fourth opening position P8, thereby causing the front fork shock-absorbing damper 100 to absorb shocks from the aforesaid sudden impact pressure.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A front fork for a vehicle, comprising:
an upper front fork tube;
a lower front fork tube axially movably coupled to said upper front fork tube;
a fluid contained in the upper and lower front fork tubes; and
a damper immersed in the fluid;
wherein said damper comprises:
a cylindrical main body fixedly sealedly fastened to a bottom side inside said upper front fork tube, said main body having a fluid inlet and a fluid outlet axially extended therethrough, and at least one through hole in communication between said fluid inlet and an outside of said cylindrical main body;
a first blocking member mounted in the fluid inlet of said main body and movable between a first blocking position where said first blocking member blocks said through hole to prohibit flowing of said fluid from said lower front fork tube upwards to said upper front fork tube, and a first opening position where said first blocking member is moved away from said through hole for enabling said fluid to pass upwards from said lower front fork tube through said fluid inlet and said through hole to said upper front fork tube;
a first spring member mounted in said fluid inlet for holding said first blocking member in said first blocking position;
a second blocking member mounted in said fluid inlet above said first blocking member and movable between a second blocking position where said second blocking member blocks said fluid inlet, and a second opening position where said second blocking member opens said fluid inlet;
a second spring member mounted in said fluid inlet for pushing said second blocking member to said second blocking position;
a control rod inserted into said upper front fork tube and movable by an external force between a locking position where said second blocking member is positioned in said second blocking position, and an unlocking position wherein said control rod pushes said second blocking member to said second opening position and holds said second blocking member in said second opening position;
a third blocking member mounted in said fluid outlet of said main body and movable between a third blocking position where said third blocking member prohibits said fluid from passing upwards from said lower front fork tube through said fluid outlet of said main body to said upper front fork tube, and a third opening position where said fluid is allowed to flow downwards from said upper front fork tube through said fluid outlet to said lower front fork tube; and
a third spring member mounted in said fluid outlet for holding said third blocking member in said third blocking position.

2. The front fork as claimed in claim 1, wherein said second blocking member has an inside hole and a top through hole in a top side thereof in communication with said inside hole, and said damper further comprises a spacer member fixedly fastened into the inside hole of said second blocking member, said spacer member having an axial through hole extended through top and bottom ends thereof, a fourth blocking member mounted in said inside hole of said second blocking member and movable between a fourth blocking position where said fourth blocking member blocks the passage between said inside hole and said fluid inlet and a fourth opening position where said inside hole is in communication with said fluid inlet, and a fourth spring member for holding said fourth blocking member in said fourth blocking position.

3. The front fork as claimed in claim 2, wherein said main body comprises an upper shoulder extended around an upper end of said fluid inlet, and a bottom shoulder extended around a bottom end of said fluid inlet; said first blocking member comprises a hollow body fitting said fluid inlet and a blocking head extended from a bottom side of the body of said first blocking member; said first spring member is a coil spring having a first end stopped at said top shoulder and a second end pressed on the body of said first blocking member to push the body of said first blocking member downwards to force said blocking head against said bottom shoulder, holding said first blocking member in said first blocking position.

4. The front fork as claimed in claim 3, wherein said second blocking member is a hollow cylindrical member having an outer diameter smaller than an inner diameter of said first blocking member; said second spring member is a coil spring having a first end stopped at a bottom side of said second blocking member and a second end inserted into said first blocking member and stopped at a part inside said blocking head; said fourth blocking member is a ball; said fourth spring member is a coil spring having a first end stopped at a part inside said second blocking member and a second end stopped at said ball against the top through hole of said spacer member.

5. The front fork as claimed in claim 4, wherein said control rod has a bottom end stopped against the top side of said second blocking member, and a bottom notch formed in the bottom end of said control rod for enabling the inside hole of said second blocking member to be in communication with the outside of said main body through the top through hole of said second blocking member when said control rod is in said locking position.

6. The front fork as claimed in claim 5, wherein said main body comprises a neck on a middle thereof, a through hole vertically disposed above said neck, a guide rod inserted into the through hole of said main body and disposed in parallel to said control rod for synchronous movement with said control rod.

* * * * *